US008848702B2

(12) United States Patent
Troan et al.

(10) Patent No.: US 8,848,702 B2
(45) Date of Patent: Sep. 30, 2014

(54) AUTOMATED TRANSITIONING BETWEEN DIFFERENT COMMUNICATION PROTOCOLS IN A NETWORK

(75) Inventors: Ole Troan, Oslo (NO); William Mark Townsley, Paris (FR); Gunter Van de Velde, Lint (BE); Wojciech Dec, Amsterdam (NL)

(73) Assignee: Cisco Technology, Inc., San Jose, CA (US)

( * ) Notice: Subject to any disclaimer, the term of this patent is extended or adjusted under 35 U.S.C. 154(b) by 117 days.

(21) Appl. No.: 13/031,197

(22) Filed: Feb. 19, 2011

(65) Prior Publication Data

US 2012/0213220 A1 Aug. 23, 2012

(51) Int. Cl.
*H04L 12/28* (2006.01)
*H04L 12/56* (2006.01)
*H04L 29/06* (2006.01)

(52) U.S. Cl.
CPC ................... *H04L 45/741* (2013.01); *H04L 69/167* (2013.01)
USPC .......................................... 370/389; 370/401

(58) Field of Classification Search
CPC ................... H04L 29/06625; H04L 29/12575; H04L 29/06632; H04L 12/4633
USPC ..................................... 370/467, 389, 395.52
See application file for complete search history.

(56) References Cited

U.S. PATENT DOCUMENTS 6,768,726 B2 * 7/2004 Dorenbosch et al. ......... 370/331
2004/0004940 A1 1/2004 Abrol et al.
2004/0052257 A1 * 3/2004 Abdo et al. ................... 370/392
2006/0092964 A1 * 5/2006 Park et al. ..................... 370/437
2009/0310607 A1 * 12/2009 Evans ........................... 370/389

OTHER PUBLICATIONS

PCT International Search Report and the Written Opinion of the International Searching Authority for PCT Application PCT/US2012/023310 (which claims priority to U.S. Appl. No. 13/031,197), ISA/US, mailed May 15, 2012 (seven pages).
B. Carpenter and K. Moore, "Connection of IPv6 Domains via IPv4 Clouds," RFC 3056, The Internet Society, Feb. 2001, (twenty-three pages).
P. Savola and C. Patel, "Security Considerations for 6to4," RFC 3964, The Internet Society, Dec. 2004 (forty-one pages).
W. Townsley and O. Troan, "IPv6 Rapid Deployment on IPv4 Infrastructures (6rd)—Protocol Specification," RFC 5969, The Internet Society, Aug. 2010, (eighteen pages).
F. Templin, "Intra-Site Automatic Tunnel Addressing Protocol (ISATAP)," RFC 5214, The Internet Society, Mar. 2008, (fifteen pages).
C. Huitema, "Teredo: Tunneling IPv6 over UDP through Network Address Translations (NATs)," RFC 4380, The Internet Society, Feb. 2006, (fifty-three pages).

(Continued)

*Primary Examiner* — Man Phan
*Assistant Examiner* — Mewale Ambaye
(74) *Attorney, Agent, or Firm* — The Law Office of Kirk D. Williams

(57) ABSTRACT

One embodiment includes, inter alia, methods, apparatus, computer-storage media, mechanisms, and/or means associated with automated transitioning between different communication protocols in a network. In one embodiment, automatic transition routers are automatically discovered along with the knowledge of what non-native protocols need to be transported across a network. Communication pathways are automatically established as needed to transport these non-native protocols. One embodiment is particularly useful in transitioning a network from one protocol to another, such as from Internet Protocol version 4 to version 6.

22 Claims, 11 Drawing Sheets

(56) References Cited

OTHER PUBLICATIONS

J. Wu et al., "Softwire Mesh Framework," RFC 5565, The Internet Society, Jun. 2009, (thirty-one pages).

Response to Communication for European Patent Application No. 12746534.2 (which claims priority to U.S. Appl. No. 13/031,197), Mathys & Squire, London, England, UK filed Feb. 24, 2014 (seventeen pages).

* cited by examiner

AUTOMATED TRANSITIONING BETWEEN DIFFERENT COMMUNICATION PROTOCOLS IN A NETWORK

TECHNICAL FIELD

The present disclosure relates generally to automated transitioning between different communication protocols in a network, such as, but not limited to, an automated transition of a network between Internet Protocol versions 4 to 6.

BACKGROUND

The communications industry is rapidly changing to adjust to emerging technologies and ever increasing customer demand. This customer demand for new applications and increased performance of existing applications is driving communications network and system providers to employ networks and systems having greater speed and capacity (e.g., greater bandwidth). In trying to achieve these goals, a common approach taken by many communications providers is to use packet switching technology.

Internet Protocol version 4 (IPv4) is widely deployed and used in local and wide area networks, including the Internet, to communicate information. Internet Protocol Version 6 (IPv6) is a version of the Internet Protocol that is designed to succeed IPv4. However, the headers of IPv4 and IPv6 are significantly different; and therefore, these protocols do not interoperate directly.

BRIEF DESCRIPTION OF THE DRAWINGS

The appended claims set forth the features of one or more embodiments with particularity. The embodiment(s), together with its advantages, may be best understood from the following detailed description taken in conjunction with the accompanying drawings of which:

DESCRIPTION OF EXAMPLE EMBODIMENTS

1. Overview

Figure 1:
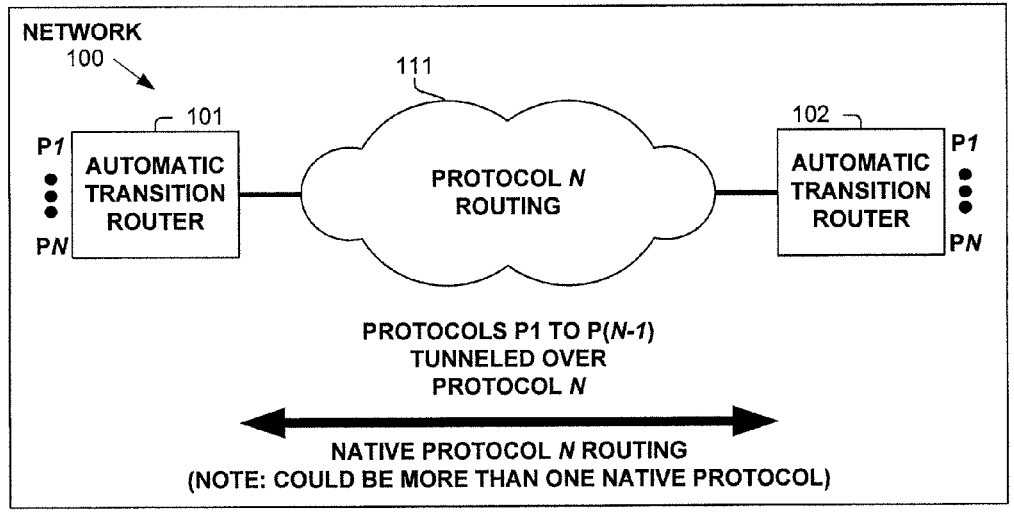
FIG. 1 illustrates a network operating according to one embodiment.

Disclosed are, inter alia, methods, apparatus, computer-storage media, mechanisms, and means associated with automated transitioning between different communication protocols in a network. One embodiment includes a method performed in a network including a plurality of automatic transition routers. Of course, one embodiment includes aspects of the transitioning by a single, or more than one automatic transition routers. Further, one embodiment operates to automatically transition among communications protocols other than Internet Protocols and/or between different Internet Protocol versions. The use of particular protocols is used for illustrative purposes and ease of reader comprehension, by describing one example of the use of an embodiment.

One embodiment operates initially in a predominant Internet Protocol version 4 (IPv4) network which is transitioning to become an Internet Protocol version 6 (IPv6) network. Automatic transition routers auto-discover other automatic transition routers and/or islands of Internet Protocol version 6 (IPv6) coupled to the automatic transition routers. IPv4 tunnels between these islands are automatically calculated based on an IPv4 routing database, and established. IPv6 packets are then communicated over these established IPv4 tunnels to provide IPv6 communication between the automatic transition routers and IPv6 islands which require it. As the native IPv4 of the network is replaced by, or operates in parallel with, IPv6, the network is updated to automatically add and remove IPv4 and/or IPv6 tunnels as required to communicatively couple these protocol islands. For example, in one embodiment, when IPv6 islands which were previously communicatively coupled over IPv4 tunnels become coupled via IPv6, the IPv6 packets are communicated over the IPv6 network portion, and no longer over the IPv4 tunnels (which may be removed from the network). Additionally, as the transitioning to IPv6 occurs, IPv4 islands may be created, and the same process described above is employed by one embodiment to auto-discover the IPv4 islands, and to communicatively couple them via IPv6 tunnels.

2. Description

Disclosed are, inter alia, methods, apparatus, computer-storage media, mechanisms, and means associated with automated transitioning between different communication protocols in a network. Embodiments described herein include various elements and limitations, with no one element or limitation contemplated as being a critical element or limitation. Each of the claims individually recites an aspect of the embodiment in its entirety. Moreover, some embodiments described may include, but are not limited to, inter alia, systems, networks, integrated circuit chips, embedded processors, ASICs, methods, and computer-readable media containing instructions. One or multiple systems, devices, components, etc. may comprise one or more embodiments, which may include some elements or limitations of a claim being performed by the same or different systems, devices, components, etc. A processing element may be a general processor, task-specific processor, or other implementation for performing the corresponding processing. The embodiments described hereinafter embody various aspects and configurations, with the figures illustrating exemplary and non-limiting configurations. Note, computer-readable media and means for performing methods and processing block operations (e.g., a processor and memory or other apparatus configured to perform such operations) are disclosed and are in keeping with the extensible scope and spirit of the embodiments. Note, the term "apparatus" is used consistently herein with its common definition of an appliance or device.

Note, the steps, connections, and processing of signals and information illustrated in the figures, including, but not limited to, any block and flow diagrams and message sequence charts, may typically be performed in the same or in a different serial or parallel ordering and/or by different components and/or processes, threads, etc., and/or over different connections and be combined with other functions in other embodiments, unless this disables the embodiment or a sequence is explicitly or implicitly required (e.g., for a sequence of read the value, process said read value—the value must be obtained prior to processing it, although some of the associated processing may be performed prior to, concurrently with, and/or after the read operation). Also note, nothing described or referenced in this document is admitted as prior art to this application unless explicitly so stated.

The term "one embodiment" is used herein to reference a particular embodiment, wherein each reference to "one embodiment" may refer to a different embodiment, and the use of the term repeatedly herein in describing associated features, elements and/or limitations does not establish a cumulative set of associated features, elements and/or limitations that each and every embodiment must include, although an embodiment typically may include all these features, elements and/or limitations. In addition, the terms "first," "second," etc. are typically used herein to denote different units (e.g., a first element, a second element). The use of these terms herein does not necessarily connote an ordering such as one unit or event occurring or coming before another, but rather provides a mechanism to distinguish between particular units. Moreover, the phrases "based on x" and "in response to x" are used to indicate a minimum set of items "x" from which something is derived or caused, wherein "x" is extensible and does not necessarily describe a complete list of items on which the operation is performed, etc. Additionally, the phrase "coupled to" is used to indicate some level of direct or indirect connection between two elements or devices, with the coupling device or devices modifying or not modifying the coupled signal or communicated information. Moreover, the term "or" is used herein to identify a selection of one or more, including all, of the conjunctive items. Additionally, the transitional term "comprising," which is synonymous with "including," "containing," or "characterized by," is inclusive or open-ended and does not exclude additional, unrecited elements or method steps. Finally, the term "particular machine," when recited in a method claim for performing steps, refers to a particular machine within the 35 USC §101 machine statutory class.

Expressly turning to the figures, FIG. 1 illustrates a network 100 operating according to one embodiment. As shown, network 100 includes automatic transition routers 101 and 102, communicatively coupled via network 111 natively running protocol N. (Note, network 111 may, and typically does, include other packet switching devices and communications equipment.) Routers 101 and 102 are described as "automatic transition" routers because they include the automatic transition capability of one embodiment, in addition to normal capabilities of a router.

For illustrative purposes, network 100 is running N different protocols used to communicate packets, such as, but not limited to, those of different Internet Protocol versions (e.g., IPv4) or one or more network layers used to communicate packets between packet switching devices (e.g., bridges, routers). As shown, each of automatic transition routers 101 and 102 have all N protocols (P1-PN) enabled on one or more interfaces, while network 111 only communicates packets via protocol N. This means that there are N−1 isolated islands of traffic supported by each of automatic transition routers 101 and 102, with the traffic of protocol N being communicated over network 111, which natively communicates packets using protocol N. Automatic transition routers 101 and 102 auto-discover, (typically based on a routing protocol communicated across network 111), each other and these N−1 protocol islands, and determine how to communicatively couple these N−1 protocol islands. One embodiment establishes one or more protocol N tunnels over network 111 between automatic transition routers 101 and 102, over which packets of these N−1 protocols will be communicated.

In one embodiment, protocol N refers to more than one protocol, so that the packet traffic of the N−1 protocols can be allocated and transported across these multiple native protocols. Note, the adjective "native" is used herein to refer to the basic protocol used for transporting packets in a network between routers (e.g., a layer-3 protocol that is used to communicate packets directly—i.e., not having to send over native protocol tunnels). For example, if network 111 communicates packets only via IPv4 between automatic transition routers 101 and 102 and communicates and IPv6 packets using IPv4 tunnels between automatic transition routers 101 and 102, then IPv4 is the native protocol and IPv6 is not a native protocol of network 111.

Further, network 111 can natively support one or more protocols, and these native protocol(s) used may change over time. For example in a network that is transitioning between IPv4 to IPv6, the native protocol might initial be IPv4. However, as the configuration changes such that automatic transition routers 101 and 102 can communicate directly using IPv6 over network 111, then IPv6 is now the native protocol. Additionally, in networks containing three or more automatic transition routers, there may be multiple native protocols (e.g., IPv4 between automatic transition routers A and B, and IPv6 between automatic transition routers B and C).

Examples of these progressions are illustrated by the network progressions of FIGS. 2A-2E and of FIGS. 3A-F.

Figure 2A:
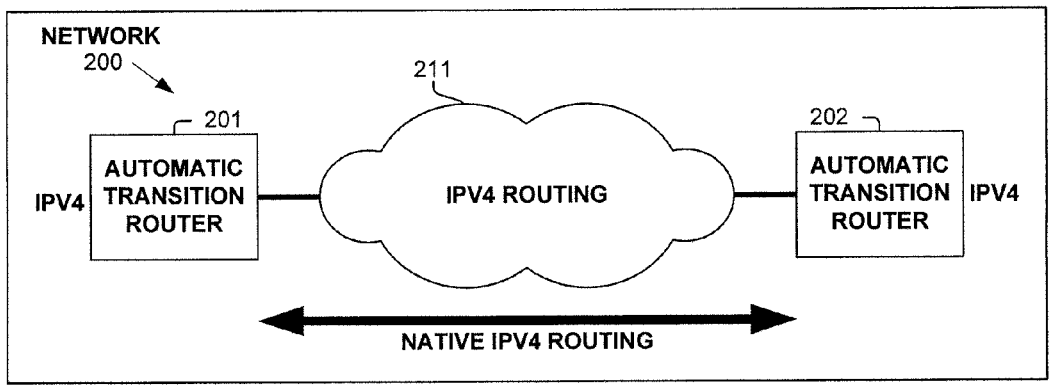
FIGS. 2A-E illustrate a network operating according to one embodiment.

FIG. 2A illustrates a network 200 operating according to one embodiment. As shown, network 200 includes automatic transition routers 201 and 202, communicatively coupled via network 211 natively using IPv4. As shown, automatic transition routers 201 and 202 each need to communicate IPv4 packets, which they can do so natively over network 211.

Figure 2B:
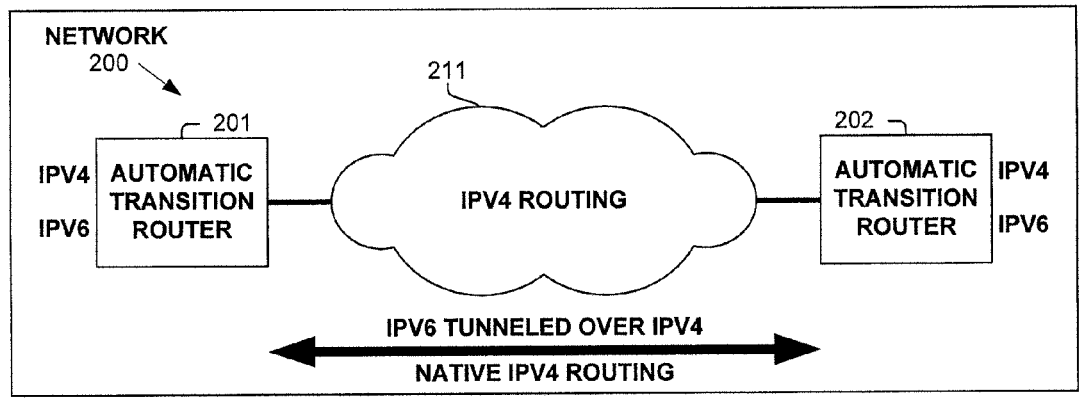

However, IPv6 functionality may be turned on one or more interfaces of each of automatic transition routers 201 and 202, such as illustrated in FIG. 2B. As shown, each of automatic transition routers 201 and 202 have both IPv4 and IPv6 enabled on interfaces other than that connected to network 211. IPv4 packets can be communicated over network 211, and conventional routing protocols will enable such communication. However, there are IPv6 islands—as IPv6 traffic on each of automatic transition routers 201 and 202 cannot be natively communicated over network 211. In response to these islands, automatic transition router 201 and/or 202 auto-discovers each other and their respective IPv6 islands (e.g., they have non-native traffic to communicate).

One embodiment performs this auto-discovery of other automatic transition and non-native protocols to be supported. In one embodiment wherein a network transition between a first to a second protocol is occurring, the non-native protocol for an interface of an automatic transition router 201 or 202 is inherent—as it is the protocol of the two protocols that is not natively being supported on the interface. In one embodiment, the identification that a particular router supports the automatic transition capability of one embodiment (e.g., it is an "automatic transition router") is communicated over the native network via a routing protocol (e.g., Border Gateway Protocol, Interior Gateway Routing Protocol, Open Shortest Path First, Intermediate System-to-Intermediate System, Interior Gateway Protocol). For example, in one embodiment, this identification is carried in an opaque value, community attribute, or other value of a routing protocol. Also, in one embodiment, the automatic transition routing capability of a router is advertised and discovered using a service description or discovery protocol. Note, in one embodiment, when a particular router, albeit automatic transition capable, does not have a non-native island of traffic to communicate (e.g., a non-native protocol is not enabled on a different interface), then it does not advertise this capability and/or other automatic transition routers do not auto-discover it as an automatic transition router. Note, in one embodiment, automatic transition routers 201 and 202 are manually configured to know of the other automatic transition routers coupled to a native network.

Based on this auto-discovery of automatic transition routers 201 and 202 and their need to communicate IPv6 traffic, a communication pathway (e.g., an IPv4 tunnel) over network 211 is automatically established for carrying non-native (non-IPv4) packet traffic. This scenario is illustrated in FIG. 2B.

Figure 2C:
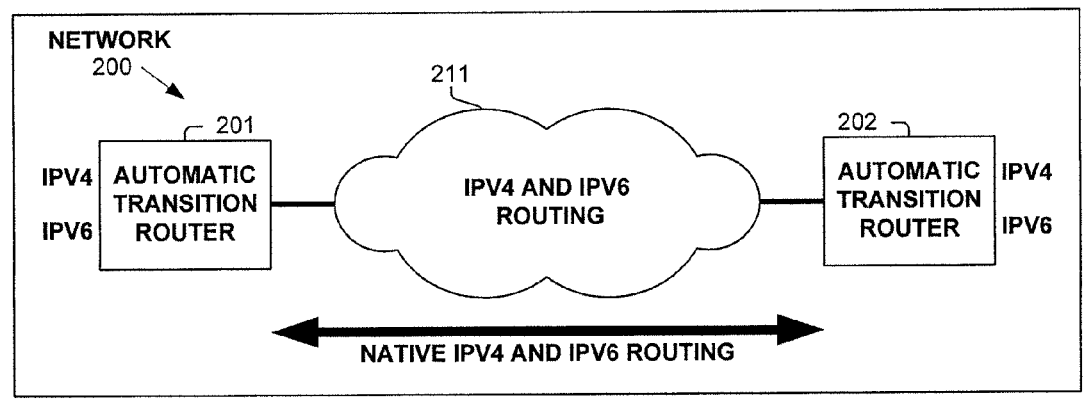

As part of a transition from IPv4 to IPv6, both of these protocols might be enabled in network 211, such as illustrated in FIG. 2C. In this case, both IPv4 and IPv6 are considered native protocols of network 211. Further, both IPv4 and IPv6 packets can be natively communicated over network 211 between automatic transition routers 201 and 202, and therefore, no tunnels are required (e.g., those illustrated in FIG. 2B), and any previously established during this transition process may be automatically removed by automatic transition router 201 and/or 202.

Figure 2D:
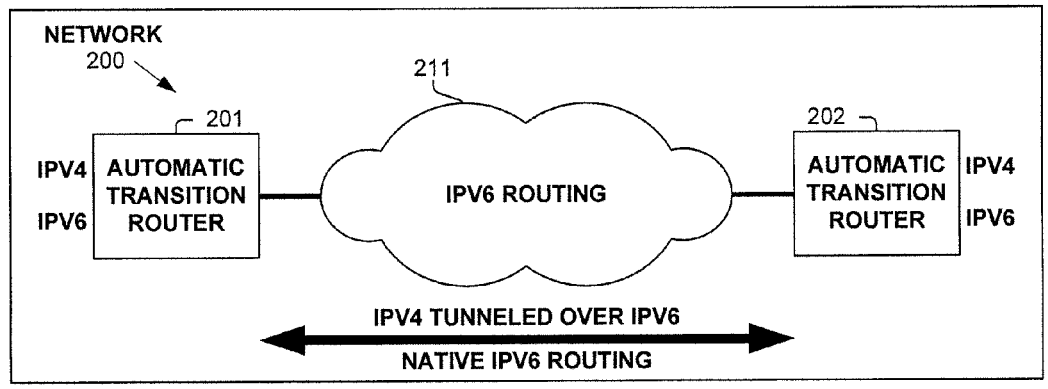

A next part of a transition from IPv4 to IPv6, might be that IPv4 routing is turned off in network 211, such as shown in FIG. 2D. In this case, automatic transition routers 201 and 202 still auto-discover each other, but the native protocol is now IPv6 (not IPv4 as illustrated in FIG. 2B), and the islands are IPv4. Therefore, automatic transition router 201 and/or 202 automatically establish a communication path (e.g., IPv6 tunnel) between them, such that IPv4 packets (e.g., non-native packets) can be carried over IPv6 native network 211.

Figure 2E:
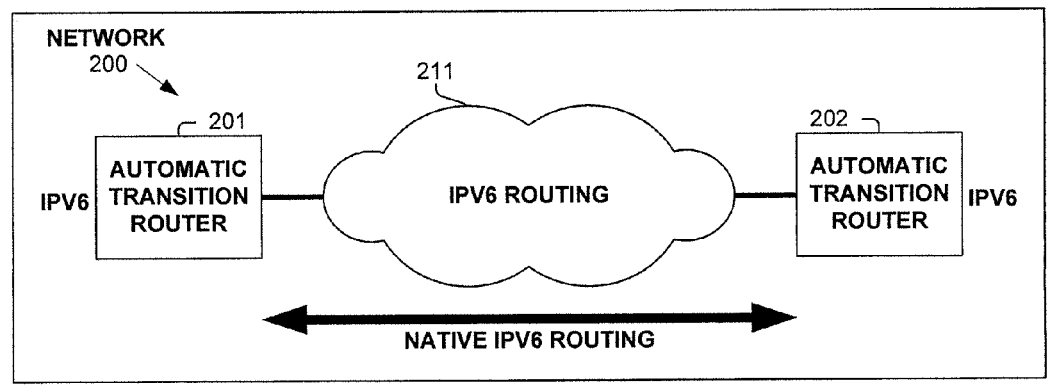

Finally, FIG. 2E illustrates where automatic transition routers 201 and 202 do not need to route non-native IPv4 traffic, and therefore, native IPv6 traffic is routed over network 211 between automatic transition routers 201 and 202.

Figure 3A:
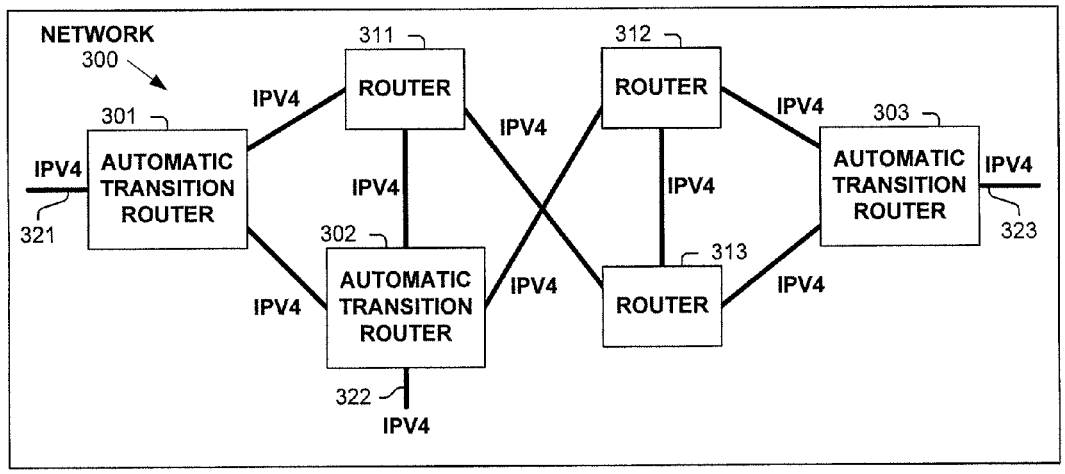
FIGS. 3A-F illustrate a network operating according to one embodiment.

Next, a transition of a network 300 from routing IPv4 to IPv6 is illustrated by the progression among FIGS. 3A-F. As shown in FIG. 3A, network 300 includes automatic transition routers 301, 302, 303, and other routers 311, 312, and 313 communicatively coupled as shown. Note, outward facing interfaces (321, 322, and 323) respectively of each of automatic transition routers 301, 302, 303 are configured only for IPv4. Therefore, packet traffic is native IPv4 in network 300.

Figure 3B:
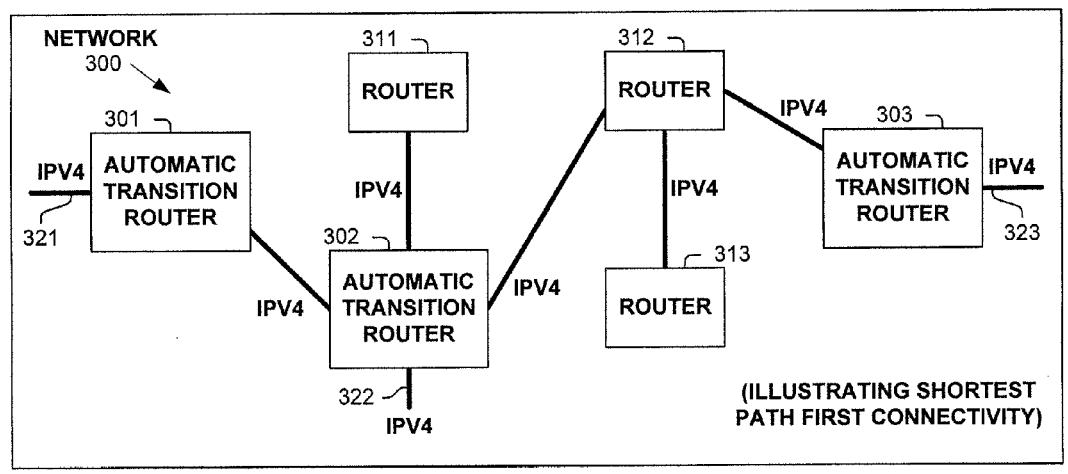

FIG. 3B illustrates a shortest path connectivity of network 300 in one embodiment (e.g., some links are removed from those illustrated in FIG. 3A). Note, the shortest path connectivity of network 300 might change over time. For purposes of the explanation using FIGS. 3A-F, the shortest path connectivity of network 300 will remain the same and be, as shown, for all protocols.

Figure 3C:
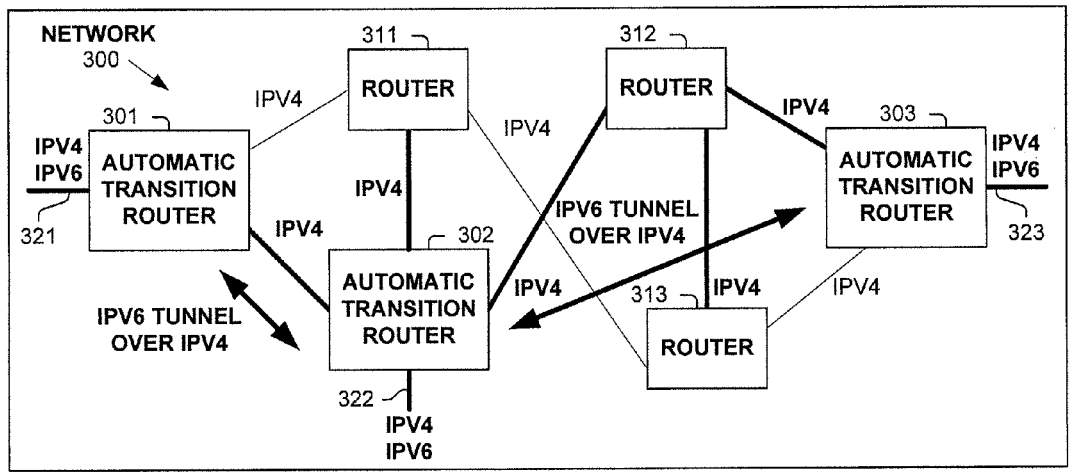

FIG. 3C illustrates where outward facing interfaces (321, 322, and 323) respectively of each of automatic transition routers 301, 302, 303 are configured for both IPv4 and IPv6. As the interior network of network 300 is IPv4 only, automatic transition routers 301, 302, 303 auto-discover each other (e.g., via a routing protocol or other discovery service) and their need to communicate IPv6 packets over the native-IPv4 portion of network 300. Automatic transition routers 301, 302, 303, therefore automatically establish IPv4 communication pathways (e.g., IPv4 tunnels) among themselves, typically based on IPv4 routing information established via a routing protocol, and possibly after a route optimization calculation (e.g., shortest path first) performed thereon. Thus, an IPv4 tunnel is established between automatic transition routers 301 and 302, and between automatic transition routers 302 and 303, which provides full IPv6 over IPv4 communicative connectivity among automatic transition routers 301, 302 and 303.

Figure 3D:
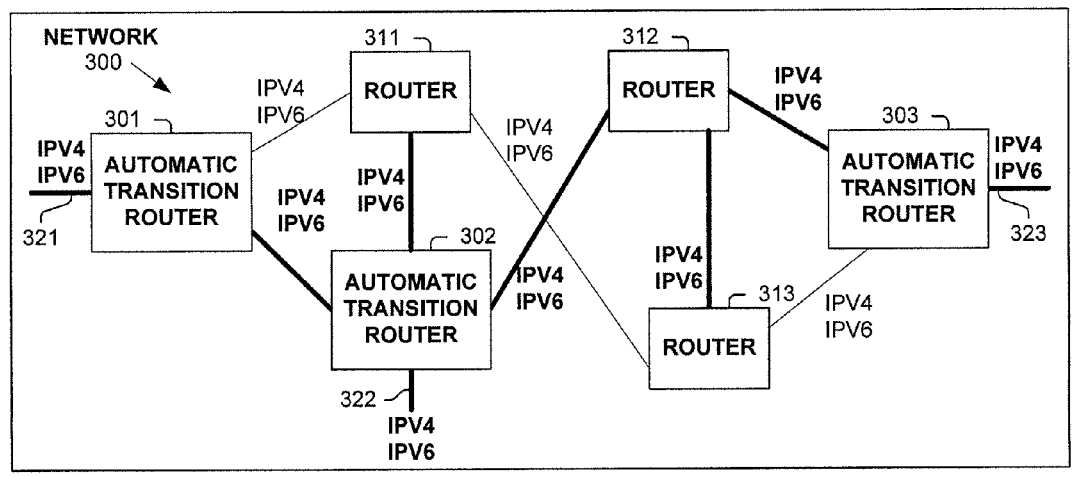

A natural progression of the transition of network 300 from IPv4 to IPv6 continues as shown in FIG. 3D, with the interior network natively supporting IPv4 and IPv6, thus no tunneling is required, and previously automatically established IPv4 tunnels for carrying IPv6 packets are typically automatically removed. Note, in one embodiment, automatic transition routers 301, 302 and 303 auto-discover the need, or lack thereof, to establish tunnels among themselves based on communicated discovery information, or by not advertising itself (e.g., as each automatic transition routers 301, 302 and 303 has no protocol island).

Figure 3E:
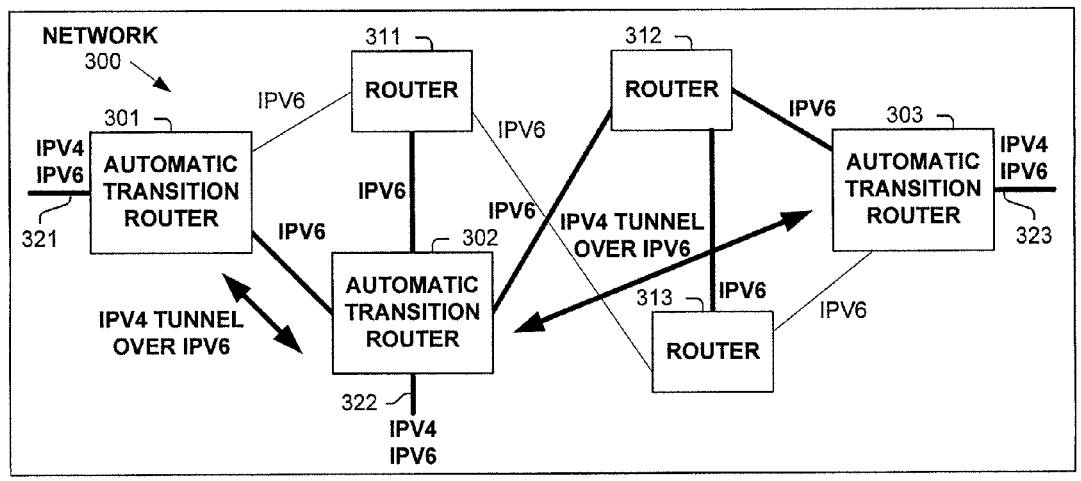

A natural progression of the transition of network 300 from IPv4 to IPv6 continues as shown in FIG. 3E, with the interior network natively supporting only IPv6, with outward facing interfaces (321, 322, and 323) respectively of each of automatic transition routers 301, 302, 303 being configured for both IPv4 and IPv6. As the interior network of network 300 is IPv6 only, automatic transition routers 301, 302, 303 auto-discover each other (e.g., via a routing protocol or other discovery service) and their need to communicate IPv4 packets over the native-IPv6 portion of network 300. Automatic transition routers 301, 302, 303, therefore automatically establish IPv6 communication pathways (e.g., IPv6 tunnels) among themselves, typically based on IPv6 routing information established via a routing protocol, and possibly after a route optimization calculation (e.g., shortest path first) performed thereon. Thus, an IPv6 tunnel is established between automatic transition routers 301 and 302, and between automatic transition routers 302 and 303, which provides full IPv4 over IPv6 communicative connectivity among automatic transition routers 301, 302 and 303.

Figure 3F:
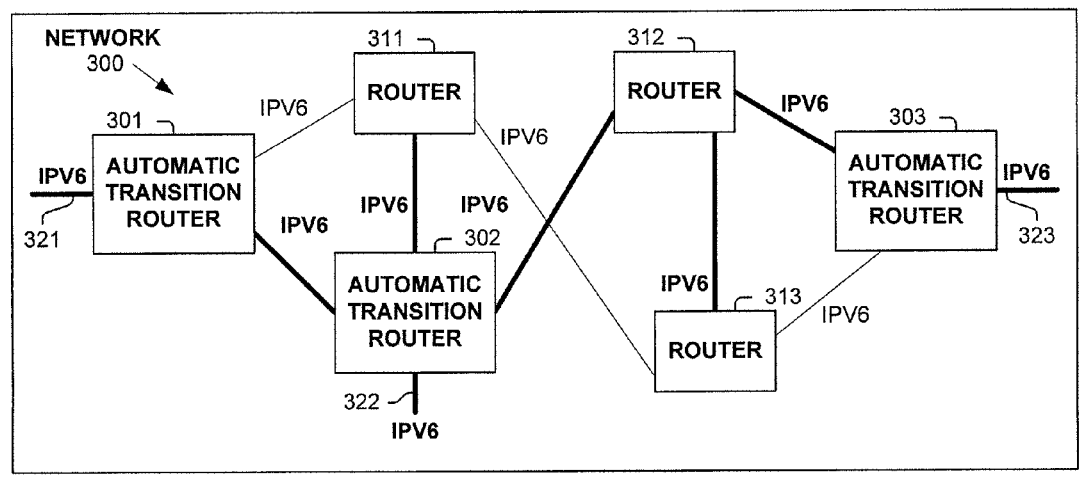

A natural progression of the transition of network 300 from IPv4 to IPv6 continues as shown in FIG. 3F, with outward facing interfaces (321, 322, and 323) respectively of each of automatic transition routers 301, 302, 303 being configured for only IPv6, and the interior portion of network 300 natively supporting IPv6. Therefore, no tunneling is required, and previously automatically established IPv6 tunnels for carrying IPv4 packets are typically automatically removed.

Figure 4A:
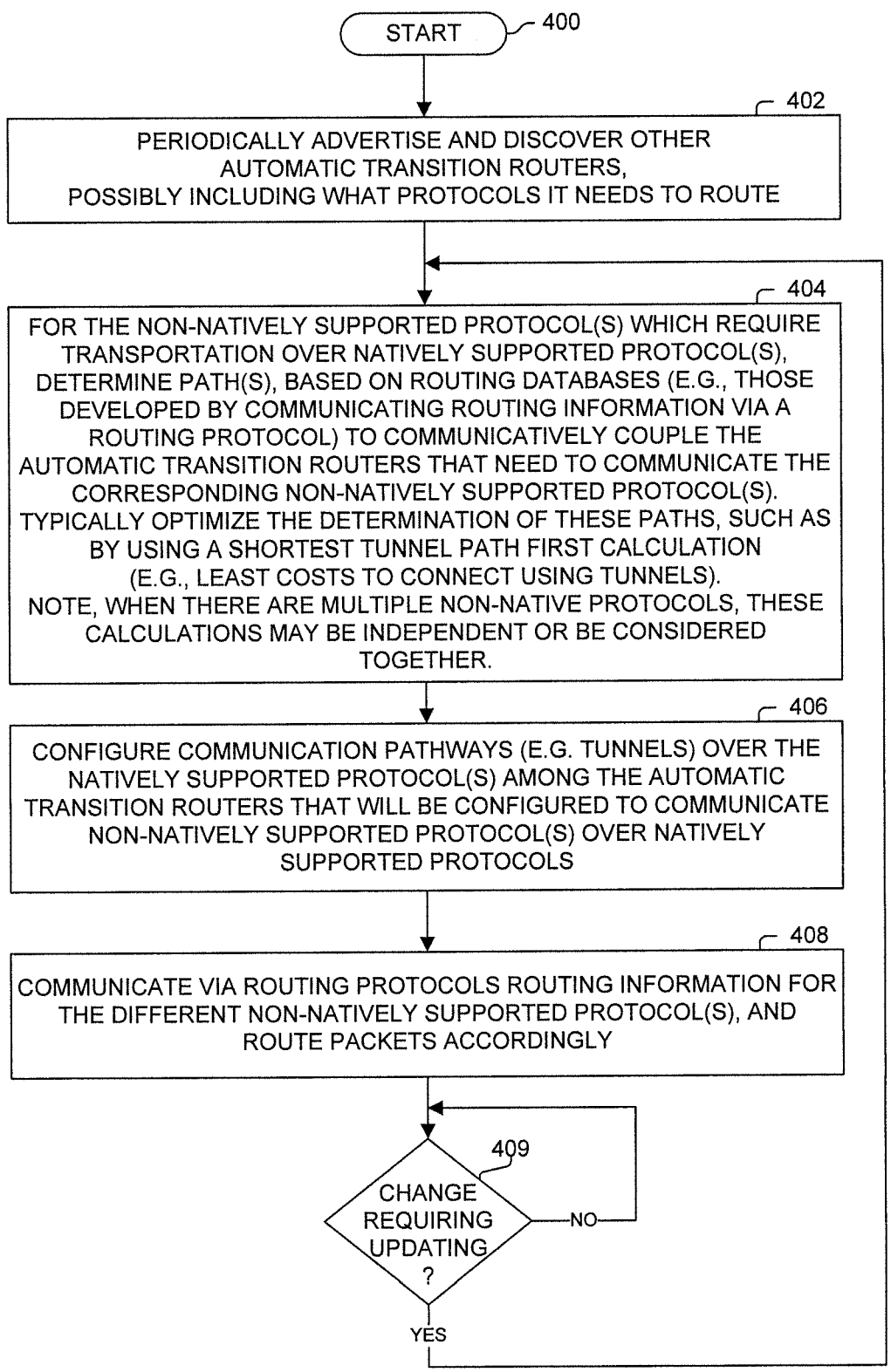
FIG. 4A illustrates a process for automatic transitioning of routers performed in one embodiment.

FIG. 4A illustrates a process for automatic transitioning of routers performed in one embodiment. Processing begins with process block 400, and proceeds to process block 402, wherein an automatic transition router periodically advertises and discovers other automatic transition routers, possibly including which protocols are not natively supported by a communicatively coupling network (e.g., what protocol islands are enabled on other interfaces of another automatic transition router).

In process block 404, for the non-natively supported protocol(s) which require transportation over natively supported protocol(s), path(s) are determined, based on routing databases (e.g., those developed by communicating routing information via a routing protocol) to communicatively couple the automatic transition routers that need to communicate the corresponding non-natively supported protocol(s). In one embodiment, an optimized set of paths is determined, such as by using a shortest tunnel path first (e.g., least cost path over tunnels) or other optimization calculation. Note, when there are multiple non-native protocols, these calculations may be independent of each other, or considered together for determining the connectivity map among the automatic transition routers.

In process block 406, the communication pathways (e.g. tunnels) are configured over the natively supported protocol(s) among the automatic transition routers (e.g., those that will be configured to communicate non-natively supported protocol(s) over natively supported protocols). This operation may include adding, removing or leaving existing tunnels in place. In process block 408, routing information for the different non-natively supported protocol(s) is communicated among the automatic transition routers, and packets are communicated accordingly.

As determined in process block 409, when there is a change in the network (e.g., different paths, a protocol change in the native network, a protocol change on interface(s) of an automatic transition router, a change in the protocol islands that need to be communicatively coupled, and/or a change in automatic transition routers such as via process block 402), then processing returns to process block 404 to update, as needed, the automatic transitioning capability of the network.

Figure 4B:
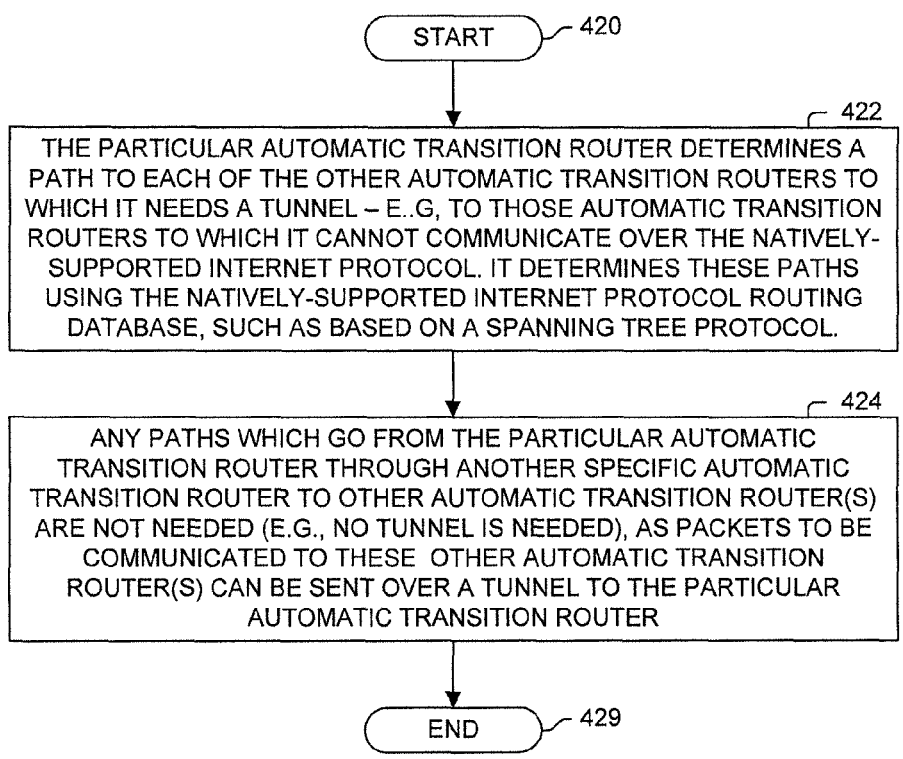
FIG. 4B illustrates a process for determining tunnels between automatic transition routers performed in one embodiment.

In one embodiment, each particular automatic transition router determines the shortest tunnel path first connectivity as illustrated in FIG. 4B, with processing beginning with process block 420. In process block 422, the particular automatic transition router determines a path to each of the other automatic transition routers to which it needs a tunnel (e.g., to those automatic transition routers to which it cannot communicate over the natively-supported internet protocol). The particular automatic transition router determines these paths using the natively-supported internet protocol routing database, such as that developed based on a spanning tree protocol. In process block 424, these paths/tunnels are filtered to remove any paths which go from the particular automatic transition router through another specific automatic transition router to other automatic transition router(s). These paths/tunnels are not needed to send packets to these other automatic transition router(s). As each of the automatic transition routers in the network will have the same spanning tree for the natively-supported internet protocol, the particular automatic transition router can rely on the specific automatic transition router forwarding packets over corresponding tunnels to these other automatic transition router(s).

In other words, assume there are five automatic transition routers in a network that need to communicate IPv6 packets, but are interconnected via IPv4 networks. Each automatic transition router can determine a path of a tunnel, based on shortest path/least cost routing information in a local IPv4 routing database, to each of the other four automatic transition routers. Those tunnels which will go through another automatic transition router are not needed, as packets could simply be sent to the automatic transition router closer in the path to the sending automatic transition router. Also, because each of the five automatic transition routers will have the same shortest path/least cost routing view of the network in their local IPv4 routing database, each automatic transition router can rely on the closest automatic transition router on a determined path to forward the packet appropriately to another automatic transition router. Also, setting up the individual tunnels/communication pathways (e.g., as performed in process block 406 of one embodiment) can be done by the two automatic transition router that are the endpoints of these tunnels, without control by another automatic transition router or centralized network management system.

Processing of the flow diagram is complete as illustrated by process block 429.

Figure 5:
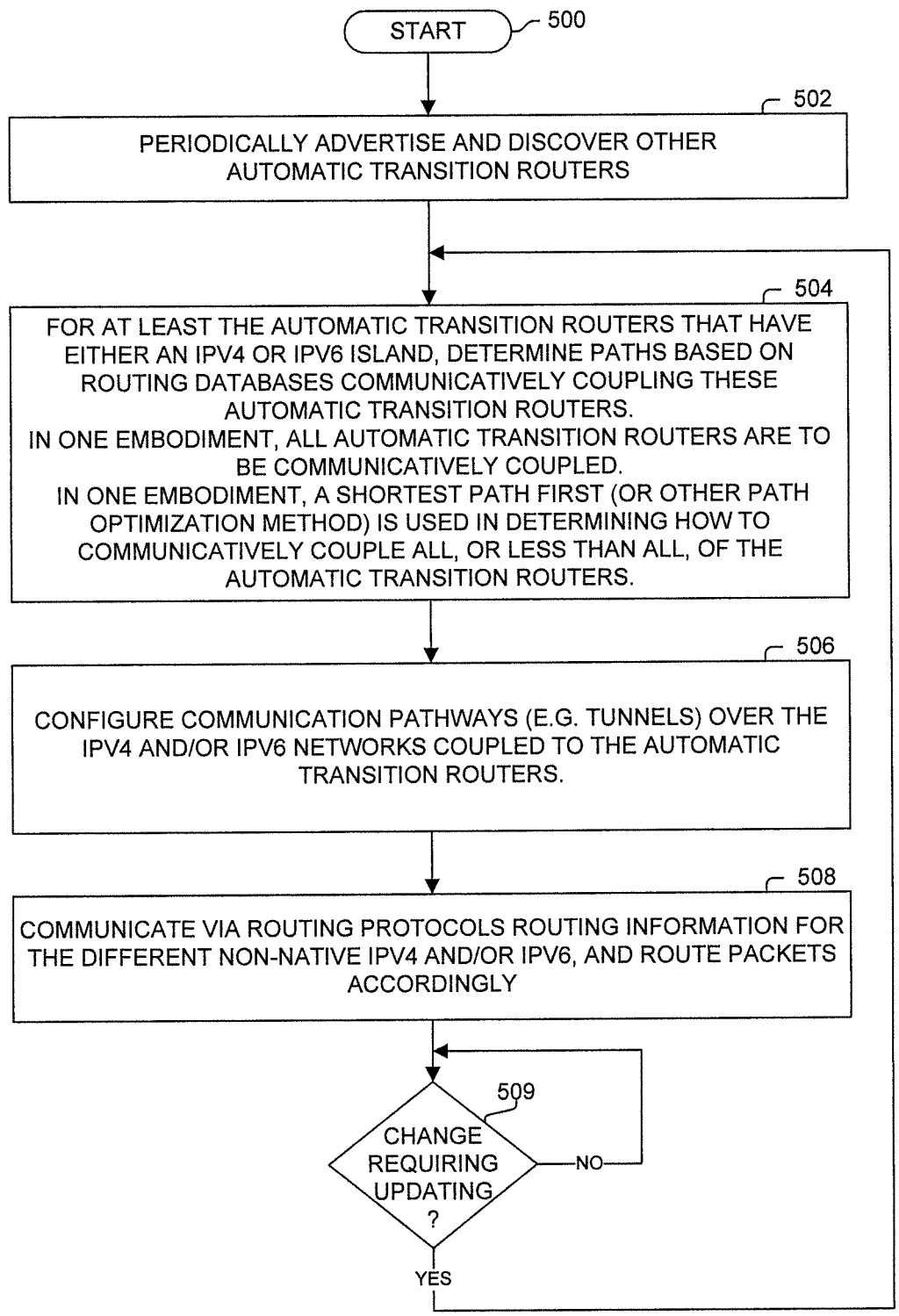
FIG. 5 illustrates a process for automatic transitioning of routers performed in one embodiment.

FIG. 5 illustrates a process for automatic transitioning of routers performed in one embodiment, with is similar to the flow diagram of FIG. 4A, but specifies IPv4 and IPv6 protocols. Processing begins with process block 500, and proceeds to process block 502, wherein an automatic transition router periodically advertises and discovers other automatic transition routers, possibly including which IPv4 and IPv6 protocols are not natively supported by a communicatively coupling network (e.g., what protocol islands are enabled on other interfaces of another automatic transition router).

In process block 504, for the non-natively supported IPv4 or IPv6 protocol which require transportation over natively supported IPv4 or IPv6 protocols, path(s) are determined, based on routing databases (e.g., those developed by communicating routing information via a routing protocol) to communicatively couple the automatic transition routers that need to communicate the corresponding non-natively supported IPv4 or IPv6 protocol. In one embodiment, an optimized set of paths is determined, such as by using a shortest path first or other optimization calculation. In process block 506, the communication pathways (e.g. tunnels) are configured over the natively supported IPv4 or IPv6 protocol among the automatic transition routers (e.g., those that will be configured to communicate non-natively supported IPv4 or IPv6 protocol over the natively supported IPv4 or IPv6 protocol). This operation may include adding, removing or leaving existing tunnels in place. In process block 508, routing information for the different non-natively supported IPv4 or IPv6 protocol is communicated among the automatic transition routers, and packets are communicated accordingly.

As determined in process block 509, when there is a change in the network (e.g., different paths, a protocol change in the native network, a protocol change on interface(s) of an automatic transition router, a change in the protocol islands that need to be communicatively coupled, and/or a change in automatic transition routers such as via process block 502), then processing returns to process block 504 to update, as needed, the automatic transitioning capability of the network.

Figure 6:
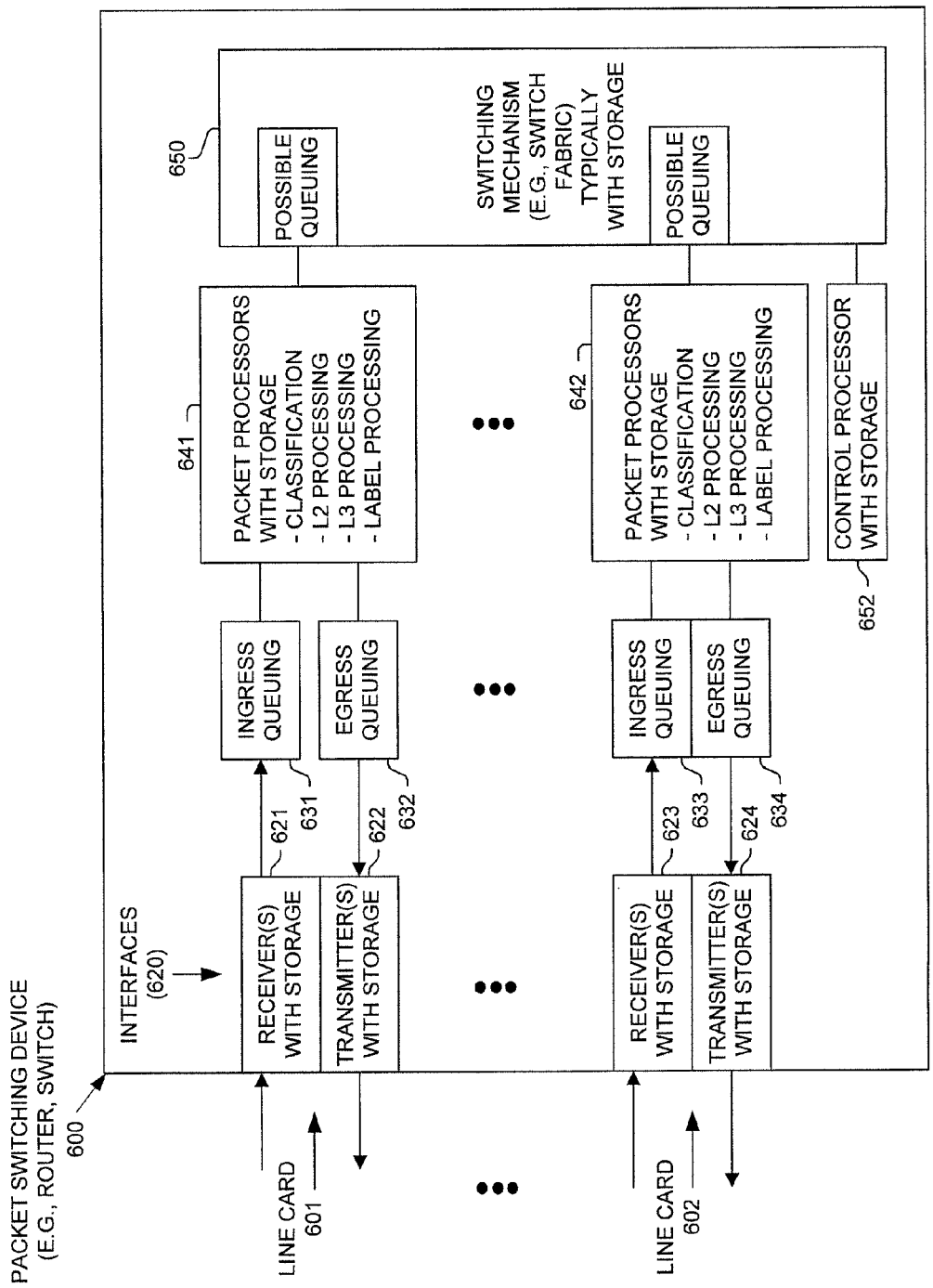
FIG. 6 illustrates a packet switching device operating according to one embodiment.

FIG. 6 illustrates an example of a packet switching device 600, (e.g., router, automatic transition router, switch) of one embodiment. As shown, packet switching device 600 comprises: line cards 601-602 which include ingress and egress interfaces (620), queuing (621-634), and packet processors with storage (641-642); switching mechanism 650 (e.g., switch fabric, bus, crossbar) which may include input or output queues (or possibly these queues are located elsewhere, such as on a line cards 601-602); and control processor with storage 652.

In one embodiment, control processor 652 auto-discovers the automatic transition routers in a coupled network, such as by, but not limited to, sending and receiving information with other routers in the network. In one embodiment, the identification that a particular router supports the automatic transition capability of one embodiment (e.g., it is an "automatic transition router") is communicated over the native network via a routing protocol (e.g., Border Gateway Protocol, Interior Gateway Routing Protocol, Open Shortest Path First, Intermediate System-to-Intermediate System, Interior Gateway Protocol). For example, in one embodiment, this identification is carried in an opaque value, community attribute, or other value of a routing protocol. Based on this information, which may include which one or more protocols that it supports that are not natively carried by the network (e.g., discovers the non-native protocol islands and to which automatic transition router(s) they are attached), control processor 652 determines communication paths that are needed among the automatic transition routers in the network, and causes these pathways (e.g., native-protocol tunnels) to be established (or at least the ones that will terminate at automatic transition router 600). Control processor 652 communicates routing information, and forwards packets accordingly. These pathways are automatically updated in response to changes in the network. Note, the operation of one embodiment of automatic transition router 600 is described herein in relation to FIGS. 1, 2A-E, 3A-F, 4, 5, and/or 7.

Figure 7:
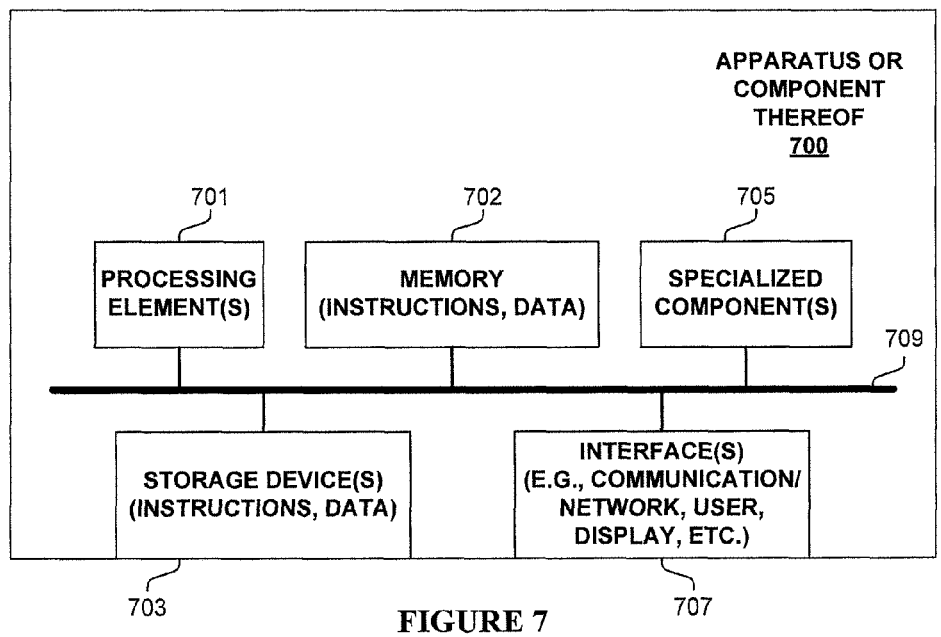
FIG. 7 illustrates an apparatus or component used in one embodiment.

FIG. 7 is block diagram of an apparatus or component 700 used in one embodiment associated with automated transitioning between different communication protocols in a network. In one embodiment, apparatus or component 700 performs one or more processes corresponding to one of the flow diagrams and/or sequence of network changes illustrated or otherwise described herein.

In one embodiment, apparatus or component 700 includes one or more processing element(s) 701, memory 702, storage device(s) 703, specialized component(s) 705 (e.g. optimized hardware such as for performing operations, etc.), and interface(s) 707 for communicating information (e.g., sending and receiving packets, user-interfaces, displaying information, etc.), which are typically communicatively coupled via one or more communications mechanisms 709, with the communications paths typically tailored to meet the needs of the application. In one embodiment apparatus or component 700 corresponds to, or is part of, network device 101 of FIG. 1.

Various embodiments of apparatus or component 700 may include more or less elements. The operation of apparatus or component 700 is typically controlled by processing element(s) 701 using memory 702 and storage device(s) 703 to perform one or more tasks or processes. Memory 702 is one type of computer-readable/computer-storage medium, and typically comprises random access memory (RAM), read only memory (ROM), flash memory, integrated circuits, and/or other memory components. Memory 702 typically stores computer-executable instructions to be executed by processing element(s) 701 and/or data which is manipulated by processing element(s) 701 for implementing functionality in accordance with an embodiment. Storage device(s) 703 are another type of computer-readable medium, and typically comprise solid state storage media, disk drives, diskettes, networked services, tape drives, and other storage devices. Storage device(s) 703 typically store computer-executable instructions to be executed by processing element(s) 701 and/or data which is manipulated by processing element(s) 701 for implementing functionality in accordance with an embodiment.

In view of the many possible embodiments to which the principles of our invention may be applied, it will be appreciated that the embodiments and aspects thereof described herein with respect to the drawings/figures are only illustrative and should not be taken as limiting the scope of the invention. For example, and as would be apparent to one skilled in the art, many of the process block operations can be re-ordered to be performed before, after, or substantially concurrent with other operations. Also, many different forms of data structures could be used in various embodiments. The invention as described herein contemplates all such embodiments as may come within the scope of the following claims and equivalents thereof.

What is claimed is:

1. A method, comprising:
    auto-discovering, by a plurality of automatic transition routers in a network, a plurality of islands of Internet Protocol version 6 (IPv6) coupled to the plurality of automatic transition routers, with the plurality of automatic transition routers being communicatively coupled via one or more Internet Protocol version 4 (IPv4) networks, wherein said auto-discovering includes each of the plurality of automatic transition routers advertising their respective automatic transition routing capability;
    responsive to said auto-discovery of the plurality of automatic transition routers and the plurality of IPv6 islands: automatically determining, by one or more of the plurality of automatic transition routers based on an IPv4 routing database, one or more IPv4 tunnels to be established between two or more of the plurality of automatic transition routers for communicatively coupling the plurality of IPv6 islands;
    responsive to said determination of said one or more IPv4 tunnels: automatically establishing said one or more IPv4 tunnels; and
    communicating IPv6 packets, between automatic transition routers of the plurality of automatic transition routers, over IPv4 tunnels of said one or more IPv4 tunnels.

2. The method of claim 1, comprising: in response to a particular pair of the plurality of IPv6 islands, said communicatively coupled via one or more particular IPv4 tunnels of said one or more IPv4 tunnels, being communicatively coupled via one or more IPv6 networks: automatically switching to communicating IPv6 packets over said one or more IPv6 networks.

3. The method of claim 2, wherein a first automatic transition router and a second automatic transition router are communicatively coupled via said one or more IPv6 networks, and previously natively IPv4 communicatively coupled to said one or more IPv4 networks; and wherein the method includes: automatically establishing one or more IPv6 tunnels between the first automatic transition router and the second automatic transition router; and communicating IPv4 packets over said one or more IPv6 tunnels.

4. The method of claim 1, comprising establishing the IPv4 routing database by communicating routing information among the plurality of automatic transition routers via a routing protocol.

5. A method, comprising:
    discovering, by a first automatic transition router based on information exchanged with one or more other routers in a network, a second automatic transition router in the network and an identification that the second automatic transition router supports automatic transitioning between a plurality of Internet Protocols, wherein said discovering of the second automatic transition router includes the second automatic transition router advertising the automatic transition routing capability of the second automatic transition router;
    based on said discovering of the second automatic transition router and its said automatic transitioning capability: determining, by the first automatic transition router based on a routing database including routing information for a natively-supported Internet Protocol, one or more paths to the second automatic transition router in the network using the natively-supported Internet Protocol in the network;
    in response to said determination of said one or more paths to the second automatic transition router: establishing a communication pathway between the first automatic transition router and the second automatic transition router; and
    communicating packets of a second Internet Protocol, different from the natively-supported Internet Protocol, over the communication pathway between the first automatic transition router and the second automatic transition router.

6. The method of claim 5, including: in response to the first automatic transition router and the second automatic transition router being able to communicate over a second Internet Protocol network, automatically switching to communicating packets of the second Internet Protocol over the second Internet Protocol network between the first automatic transition router and the second automatic transition router from said communicating packets of the second Internet Protocol over the communication pathway between the first automatic transition router and the second automatic transition router.

7. The method of claim 6, including removing the communication pathway between the first automatic transition router and the second automatic transition router.

8. The method of claim 7, including:
   determining, by the first automatic transition router based on a routing database including routing information for the second Internet Protocol, one or more second paths to the second automatic transition router in the second Internet Protocol network using the second Internet Protocol in the network;
   in response to said determination of said one or more second paths to the second automatic transition router: establishing a second communication pathway between the first automatic transition router and the second automatic transition router through the second Internet Protocol network; and
   communicating packets of the natively-supported Internet Protocol over the second communication pathway between the first automatic transition router and the second automatic transition router.

9. The method of claim 8, including automatically removing the second communication pathway between the first automatic transition router and the second automatic transition router in response to determining that there are no natively-supported Internet Protocol islands attached to each of the first automatic transition router and the second automatic transition router.

10. The method of claim 8, wherein the natively-supported Internet Protocol is Internet Protocol version 4 (IPv4), and the second Internet Protocol is Internet Protocol version 6 (IPv6).

11. The method of claim 8, wherein the natively-supported Internet Protocol is Internet Protocol version 6 (IPv6).

12. The method of claim 5, wherein the natively-supported Internet Protocol is Internet Protocol version 4 (IPv4), and the second Internet Protocol is Internet Protocol version 6 (IPv6).

13. The method of claim 12, wherein the communication pathway between the first automatic transition router and the second automatic transition router is a tunnel.

14. The method of claim 5, wherein the natively-supported Internet Protocol is Internet Protocol version 6 (IPv6).

15. An apparatus, comprising:
   one or more processing elements;
   memory;
   a plurality of interfaces configured to send and receive packets; and
   one or more packet switching mechanisms configured to packet switch packets among said interfaces;
   wherein said one or more processing elements are configured to perform operations, including:
   discover, based on information exchanged with one or more other routers in a network including an advertisement by an automatic transition router of the automatic transitions capability of the automatic transition router, the automatic transition router in the network and an identification that the automatic transition router supports automatic transitioning between a plurality of Internet Protocols;
   based on said discovering of the automatic transition router and its said discovered automatic transitioning capability: determining, based on a routing database including routing information for a natively-supported Internet Protocol, one or more paths to the automatic transition router in the network using the natively-supported Internet Protocol in the network; and
   establishing a communication pathway to the automatic transition router in response to said determination of said one or more paths to the automatic transition router; and
   wherein the apparatus is configured to communicate packets of a second Internet Protocol, different from the natively-supported Internet Protocol, over the communication pathway between the apparatus and the automatic transition router.

16. The apparatus of claim 15, wherein said operations comprise: in response to being able to communicate over a second Internet Protocol network with the automatic transition router, automatically switching to communicating packets of the second Internet Protocol over the second Internet Protocol network with the automatic transition router from said communicating packets of the second Internet Protocol over the communication pathway.

17. The apparatus of claim 16, including:
   determining, based on a routing database including routing information for the second Internet Protocol, one or more second paths to the automatic transition router in the second Internet Protocol network using the second Internet Protocol in the network;
   in response to said determination of said one or more second paths to the automatic transition router: establishing a second communication pathway with the automatic transition router through the second Internet Protocol network; and
   communicating packets of the natively-supported Internet Protocol over the second communication pathway with the automatic transition router.

18. The apparatus of claim 17, including automatically removing the second communication pathway in response to determining that there are no natively-supported Internet Protocol islands attached to each of the apparatus and the second automatic transition router.

19. The apparatus of claim 17, wherein the natively-supported Internet Protocol is Internet Protocol version 4 (IPv4), and the second Internet Protocol is Internet Protocol version 6 (IPv6).

20. The apparatus of claim 17, wherein the natively-supported Internet Protocol is Internet Protocol version 4 (IPv4), and the second Internet Protocol is Internet Protocol version 6 (IPv6).

21. The apparatus of claim 15, wherein the apparatus is an automatic transition router.

22. The method of claim 1, wherein said advertising their respective automatic transition routing capability is performed using a routing protocol.

* * * * *